March 3, 1964  O. G. OSWOLD  3,123,738
ILLUMINATION SYSTEM FOR RETINAL CAMERAS OR THE LIKE
Filed Sept. 6, 1961
FIG. 1
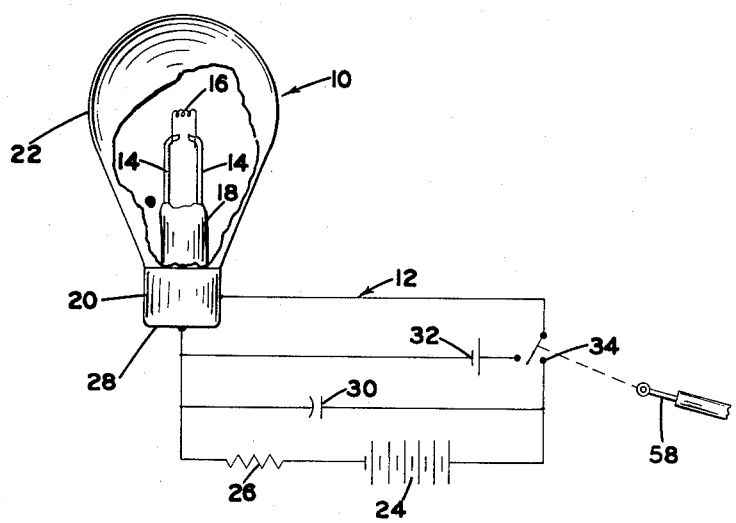
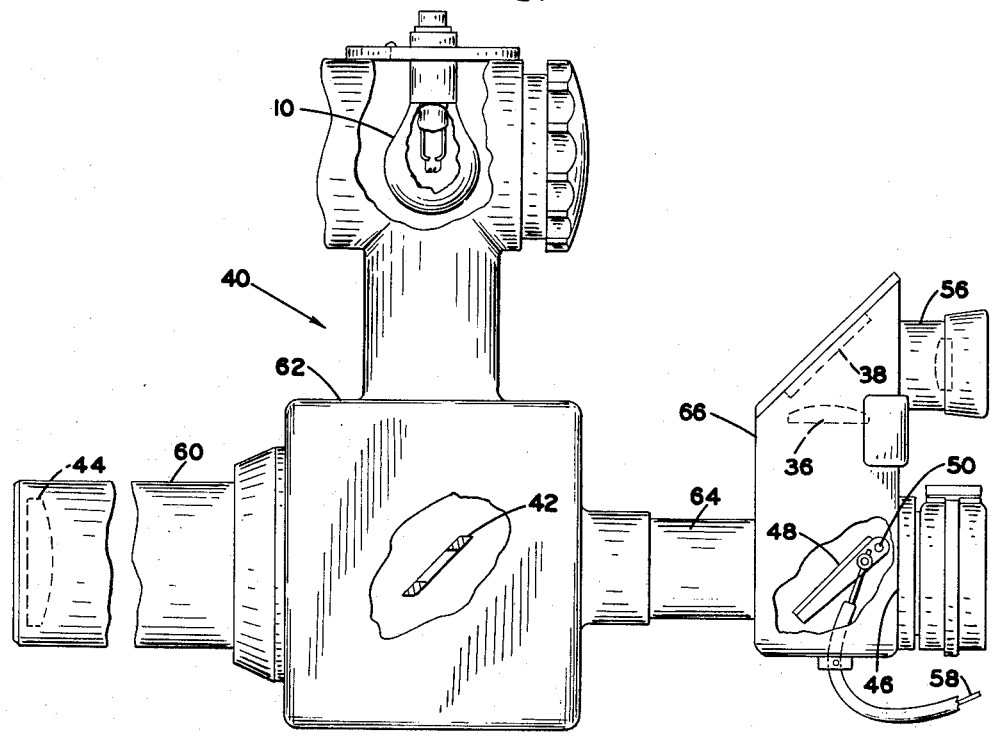
FIG. 2
INVENTOR.
OLUF G. OSWOLD
ATTORNEYS 3,123,738
ILLUMINATION SYSTEM FOR RETINAL
CAMERAS OR THE LIKE
Oluf G. Oswold, Canadice, N.Y., assignor to Bausch &
Lomb Incorporated, Rochester, N.Y., a corporation of
New York
Filed Sept. 6, 1961, Ser. No. 136,288
2 Claims. (Cl. 315—46)

This invention relates to a novel illumination system for retinal cameras or the like and more particularly to an illumination system having enhanced spectral characteristics.

The demand of the ophthalmic profession for convenient rapid repetitive operation of retinal cameras has led to the use of so called strobe devices. These devices are normally equipped with means for supplying a relatively low intensity illumination for focusing of the retinal camera, and are also equipped with means for supplying a relatively high intensity illumination for photographing the fundus of an eye.

It has been found that an increase in red light during the high intensity illumination improves the contrast in a retinal photograph. For example, the small blood vessels in the fundus of an eye are shown more clearly when a photograph is taken with an illumination system having an increased output in the red region of the spectrum.

Advantageously an illumination system according to the present invention incorporates the advantages of conventional strobe units plus means for increasing the output of red light during the high intensity illumination. The focusing light produces a low intensity steady glow for facilitating focusing procedures.

A preferred embodiment of the invention incorporates a single bulb to thereby reduce the complexity of the illumination system and camera. The use of a single light source or bulb results in a reduction in the light directing elements which tends to minimize the manufacturing cost.

A pair of spaced tungsten elements and a xenon atmosphere are incorporated in the preferred embodiment. The tungsten points on the spaced elements are preferred in order to prolong the life of the bulb and to withstand the relatively high voltage discharge. The xenon atmosphere reduces the likelihood of oxidation within the envelope. Any oxidation within the envelope is undesirable since it may damage the envelope. The clarity of the envelope is important in retinal photography since any defects are apparent in the finished photograph.

An additional advantage in the present system is that it may be incorporated in conventional strobe units by making minor modifications therein. These modifications may be quickly and easily made and result in incorporating the advantages disclosed herein at a nominal cost.

A device according to the present invention is relatively small in size, relatively inexpensive to manufacture and is durable in service. Furthermore, the device may be easily operated which allows the operator to concentrate on focusing or other important aspects governing retinal photography.

Briefly, an illumination system according to the present invention comprises a light source in combination with circuit means for illuminating the light source. The light source includes a pair of spaced electrodes and a filament. In the preferred embodiment the electrodes and filament are arranged so that the spaced electrodes are shunted by the filament. The circuit means for illuminating the light source includes means for providing a low energy potential across the filament to thereby illuminate the light source at a relatively low intensity. The circuit also includes means for providing a high energy potential across the spaced electrodes to provide an electric discharge across the gap for the high intensity illumination and means for increasing the output of red light.

In the operation of the preferred embodiment wherein the spaced electrodes are shunted by the filament, the circuit is adapted to provide an electric discharge across the electrodes when the high energy circuit is open. The high energy potential heats the filament and causes a red glow which increases the output of light in the red range of the spectrum. This produces the desirable characteristics for retinal photography.

The invention will now be described in more detail in connection with the accompanying drawings, in which;

FIG. 1 is a schematic illustration of the present invention; and

FIG. 2 is a diagrammatic view of a retinal camera incorporating an illumination system according to the present invention.

Referring now more particularly to the drawings, an electric bulb 10 is connected to an electric circuit 12. The bulb 10 comprises a pair of spaced electrodes 14 and a filament 16 which forms a shunt circuit across the electrodes 14. The electrodes 14 and filament 16 are mounted in a glass base 18 which extends into a normal bayonet base 20. The assembly is arranged within a glass envelope 22 which is sealed at the base 20 in a conventional manner. It is desirable to use tungsten for the electrodes 14 and to fill the envelope 22 with xenon gas.

The electrical circuit 12 for illuminating the light 10 is shown schematically in FIG. 1. The circuit 12 comprises a high voltage power supply 24 and resistor 26 connected in series to the base 28 of the lamp 10. A capacitor 30 is connected in parallel arrangement in the circuit and separates the power supply 24 and resistor 26, from the base 28 of the lamp 10. A second part of the circuit includes a low voltage power supply connected in series with the lamp 10. The low voltage power supply provides energy for illuminating the lamp 10 by a drop in potential across the filament 16. A two position switch 34 operably interconnects the lamp 10 with both portions of the circuit 12. The switch 34 is arranged to complete the circuit between the power supply 32 and the bulb 10, this arrangement energizes the filament 16 for focusing purposes. The switch 34 also has a second position. In the second position the switch 34 opens the low energy circuit and connects the second portion of the circuit to the bulb 10. The second portion of the circuit includes a capacitor 30. The lamp 10 is connected to the second portion of the circuit by the switch 34 and allows the capacitor 30 to be discharged. The resulting current flow is divided between the spaced electrodes 14 and the filament 16. The filament 16 is heated by a small portion of the current and the major portion of the current causes an electric discharge across the elements 14. This latter discharge provides the high intensity illumination for photographic purposes. The switch 34 will then be returned to the first position onto a neutral position which allows the capacitor 30 to be recharged for the next successive flash.

FIG. 2 shows a retinal camera which incorporates an illumination system according to the present invention. The illumination system 10 is shown in the upper portion of the drawing and is mounted in a retinal camera 40. Light from the illumination system 10 is directed on to an annular reflector 42. The annular reflector 42 reflects light rays along the optical axis on the retinal camera 40 through an objective lens 44 for illuminating the field of interest, i.e. the fundus of an eye.

Imaging light rays pass through the objective lens 44, through an aperture in the annular reflector 42 which serves as an aperture stop in the camera, and are focused on a film plate 46. A reflex mirror 48 is mounted on a pivot 50 to reflect the imaging rays through an objective lens 36 on to an inclined mirror 38 and to an eyepiece assembly 56. The reflex mirror 48 is moved out of the ray path by the initial movement of a Bowden wire 58 which also actuates the switch 34 to de-energize the focusing portion of the circuit and to energize the high energy portion of the circuit to illuminate the interior of the eye.

The operable parts of the retinal camera described above are mounted in a casing which comprises a front tubular section 60, a central housing 62 and a rear tubular section 64. The rear section 64 carries a housing 66 which contains the reflex assembly, eyepiece and film magazine. The annular mirror 42 is mounted in the central housing 62 which also carries the front and rear tubular sections as well as the illumination system mounted thereon.

What is claimed is:

1. An illumination system for a retinal camera or the like, comprising a light source including a pair of spaced electrodes and a filament shunting said electrodes, electrical means including a circuit and a source of low energy, means connecting said electrical means to said light source whereby said electrical means energizes said filament to produce illumination of relatively low intensity, and circuit means including a capacitor and a switch producing an electric discharge across said pair of spaced electrodes to thereby provide sufficient illumination for photographing the fundus of an eye, said last named means heating said filament to thereby enhance the spectral quality of the illumination by increasing the out-put of light in the red region of the spectrum.

2. An illumination system for a retinal camera or the like according to claim 1 in which said light source comprises a pair of spaced tungsten electrodes and a filament enclosed in a transparent envelope, and said envelope is filled with an inert gas.

References Cited in the file of this patent

UNITED STATES PATENTS

| | | |
|---|---|---|
| 2,060,584 | McIlvaine | Nov. 10, 1936 |
| 2,219,890 | Freitag | Oct. 29, 1940 |
| 2,393,316 | Edgerton | Jan. 22, 1946 |
| 2,624,831 | Faber | Jan. 6, 1953 |

FOREIGN PATENTS

| | | |
|---|---|---|
| 1,089,067 | Germany | Sept. 15, 1960 |